UNITED STATES PATENT OFFICE 2,440,221

PREPARATION OF XANTHOPTERIN

George H. Hitchings, Tuckahoe, N. Y., assignor to Burroughs Wellcome & Co. (U. S. A.) Inc., New York, N. Y., a corporation of New York No Drawing. Application May 9, 1945, Serial No. 592,911

6 Claims. (Cl. 260—250)

The present invention relates to the production of xanthopterin.

One object of the invention is the preparation of xanthopterin from 5-dichloroacetamino 2,4-diamino-6-hydroxy-pyrimidine.

Another object of the invention is to produce xanthopterin by a new process giving a high yield.

These objects are accomplished according to the invention by introducing a new principle for effecting ring closure to form xanthopterin

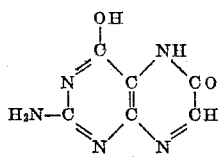

from 5-dichloroacetamino - 2, 4 - diamino-6-hydroxypyrimidine

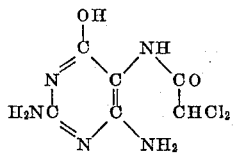

It has been found that when the pyrimidine derivative is dissolved in an aqueous alkali, such as sodium hydroxide, potassium hydroxide or the like, and a quantity of a lower alcohol considerably in excess of the quantity of water is present a reaction soon begins which results in the liberation of chloride ion and the formation of xanthopterin. The elimination of chloride proceeds at a measurable rate only after the addition of alcohol. The desired result is accomplished with any of the lower alcohols, such as methanol, ethanol, propanol, butanol and pentanol, but for practical reasons I prefer to use ethanol. Various amounts of alkali may be used in making the desired product. If a strong alkali is used, it is preferred to employ two equivalents of alkali for each molecule of the pyrimidine derivative. However, larger amounts of a weaker base, such as ammonia, may be employed with good results. It is also desirable to maintain a temperature somewhat below ordinary room temperature, i. e. 10–25° C. After standing one to two hours the reaction is complete and the xanthopterin can be recovered and purified by dissolving and reprecipitating the compound according to known procedures.

The invention is illustrated by the following:

Example 1

1.52 gm. 5-dichloroacetamino-2,4-diamino-6-hydroxy-pyrimidine was dissolved in 10 ml. 1.13 normal sodium hydroxide (15° C.). As soon as solution was complete, 250 ml. absolute ethanol was added. The solution was allowed to stand in the refrigerator 35 minutes, then 2 hours 10 minutes at 25° C. 500 ml. of water was added, the solution was filtered and 1 ml. of glacial acetic acid was added. The solution then was allowed to stand at 10° C. for 20 hours. The mixture was filtered and the precipitate was dissolved in 2 normal hydrochloric acid and reprecipitated with sodium actetate in the known way. There was obtained 673 mg. of xanthopterin hydrate (56.7% of the theoretically possible amount).

Example 2

270 mg. of the dichloroacetamino compound were dissolved in 25 ml. of concentrated aqueous ammonia and 100 ml. of absolute and 210 ml. of 95 per cent ethyl alcohol were added and the solution was allowed to stand for one week. Xanthopterin was isolated in 80 per cent yield.

Example 3

250 mg. of dichloroacetamino compound were dissolved in 2 ml. of 1.0 normal sodium hydroxide solution and 50 ml. of absolute methanol were added and the solution was treated as in Example 1. Xanthopterin was isolated in 67 per cent yield.

What is claimed is:

1. A process for preparing xanthopterin from 5-dichloroacetamino-2,4-diamino - 6-hydroxypyrimidine comprising the steps of dissolving 5-dichloroacetamino-2,4-diamino - 6-hydroxypyrimidine in an aqueous alkali, adding to the solution a large excess of a lower alcohol to effect the removal of 2 mols of hydrochloric acid from the pyrimidine derivative, and recovering xanthopterin from the reaction mixture.

2. The process as claimed in claim 1 in which two equivalents of a strong alkali are present in said alkaline solution for each molecule of the pyrimidine derivative.

3. The process as claimed in claim 1 in which the pyrimidine derivative is first dissolved in an aqueous alkaline solution and a quantity of ethanol considerably in excess of the quantity of water present is subsequently added to start the reaction.

4. The process is claimed in claim 1 in which the reaction mixture is maintained at a temperature between 10° and 25° C. until the reaction is completed.

5. A process for preparing xanthopterin from 5-dichloroacetamino-2,4-diamino-6-hydroxypyrimidine comprising the steps of dissolving a quantity of 5-dichloroacetamino-2,4-diamino-6-hydroxypyrimidine in an aqueous sodium hydroxide solution containing two equivalents of sodium hydroxide for each molecule of the pyrimidine derivative, adding, after completion of the solution, a quantity of absolute ethanol, considerably in excess of the quantity of water present, cooling the solution and keeping it at a temperature of about 25° C. until the reaction is substantially completed, diluting with water, filtering, adding a small quantity of glacial acetic acid, permitting the solution to stand at 10° C. for 20 hours, filtering again and purifying the precipitate.

6. A process for preparing xanthopterin from 5-dichloroacetamino-2,4-diamino-6-hydroxypyrimidine comprising the steps of dissolving 5-dichloroacetamino-2,4-diamino-6-hydroxypyrimidine in concentrated aqueous ammonia, adding, after completion of the solution, a mixture containing per hundred parts by volume of absolute ethanol about 210 parts by volume of 95% ethanol, said mixture being added in a quantity considerably in excess of the quantity of water present, allowing the solution to stand for a period of about one week and isolating the xanthopterin formed.

GEORGE H. HITCHINGS.

REFERENCES CITED

The following references are of record in the file of this patent:
Chemical Abstracts, vol. 35, pages 2747–48.
Abstracts of Leibigs Annalen, 546 pages 98–102 (1940).